United States Patent Office 3,306,841
Patented Feb. 28, 1967

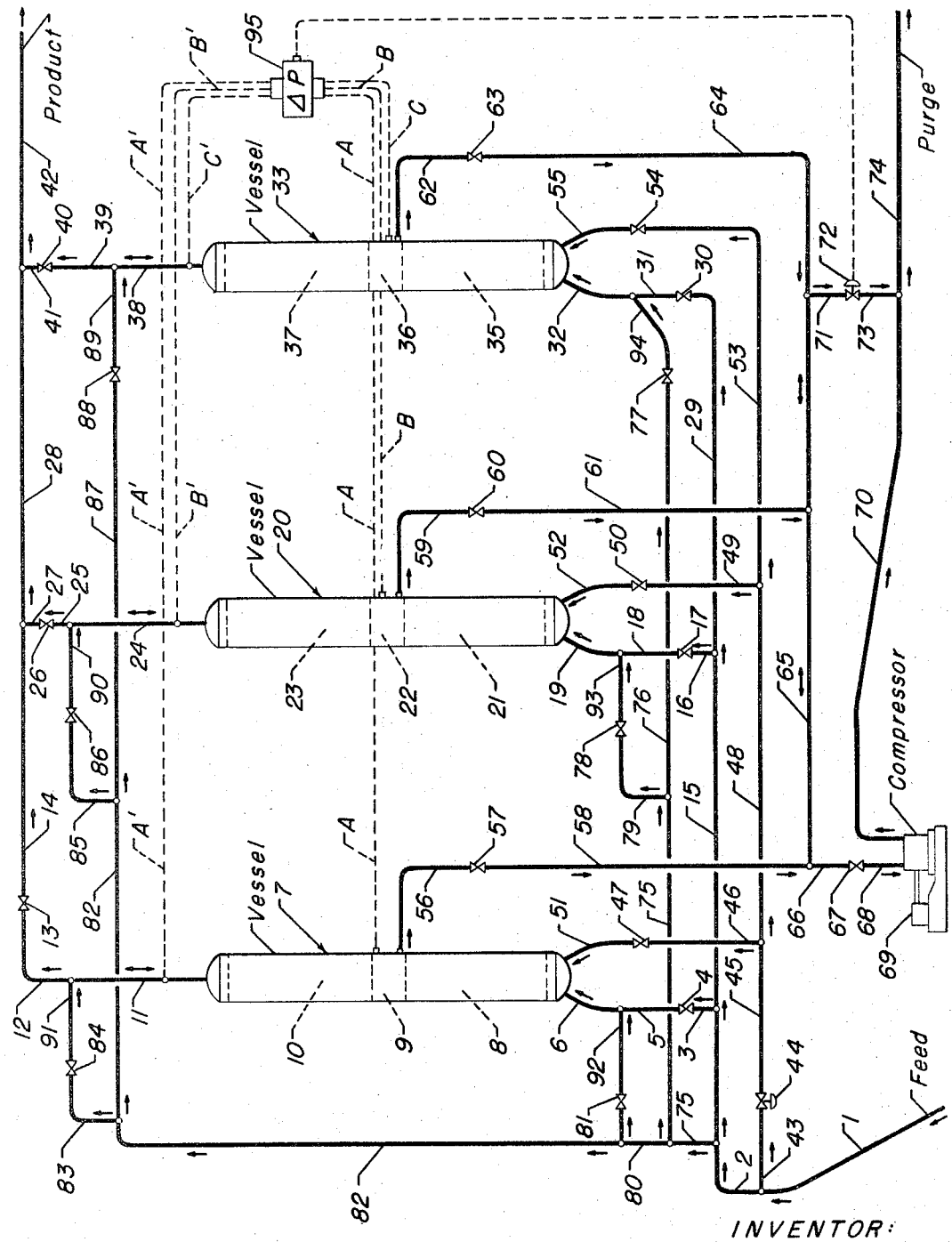

3,306,841
GAS SEPARATION PROCESS
Dennis J. Ward, Lombard, Ill., assignor to Universal Oil Products Company, Des Plaines, Ill., a corporation of Delaware
Filed Dec. 28, 1964, Ser. No. 421,461
19 Claims. (Cl. 208—108)

This invention relates to a process for the separation of a gas comprising a desirable component from a feed gaseous mixture. More specifically this invention relates to a cyclic process for the continuous separation of a gas comprising a desirable component from a feed gaseous mixture employing at least two fixed beds of adsorbent selective for the non-desirable component operated on a swing bed adsorption-desorption system. This invention further relates to the separation of a gas comprising a desirable component from a feed gaseous mixture in a process employing at least two fixed beds of adsorbent wherein a first bed is adsorbing the non-desirable components of the feed gaseous mixture thereby producing a stream of gas of enriched desirable component purity while a second bed is being regenerated by removal of the non-desirable components from the adsorbent which had been adsorbed when said second bed was on a previous adsorption cycle and at a later time utilizing said second bed on an adsorption cycle by introducing the feed mixture into it while regenerating the adsorbent in the first bed.

In one of its embodiments, this invention relates to a method for the separation of a gas comprising a desirable component from a gaseous mixture employing at least two fixed beds of adsorbent operated on a swing bed cycle which comprises the steps: introducing a feed gaseous mixture containing said desirable component into one of a first bed of active adsorbent maintained at a high pressure and withdrawing a stream of enriched desirable component purity from the other end of the first bed of adsorbent, continually passing the feed mixture through said first bed thereby deactivating adsorbent for a time less than required for a decrease in said enriched desirable component purity of the stream leaving the other end of the first bed, thereupon stopping the flow of feed mixture to the first bed while simultaneously introducing the feed into a second adsorbent bed and lowering the pressure of said first bed by withdrawing gas from a point between said one end and said other end thereby reactivating the adsorbent, continually reactivating the adsorbent at a low pressure until it is substantially at its said active state, repressuring the first bed back up to said high pressure, and completing the cycle by introducing said feed mixture into said one end of said first bed.

In another of its embodiments, this invention relates to a cyclic process for the continuous production of a product gas comprising a desirable component from a gaseous mixture employing three fixed beds of adsorbent selective for the non-desirable component which comprises the steps: introducing a feed gaseous mixture containing said desirable component into one end of a first bed of active adsorbent maintained at high pressure and withdrawing a product stream of enriched desirable component purity from the other end of said first bed, withdrawing a purge stream of enriched non-desirable component purity from a second bed of inactive adsorbent at a point between the ends of said second bed thereby reactivating the adsorbent by maintaining a low pressure in said second bed and removing the non-desirable components from the adsorbent, introducing a gas selected from the group consisting of said feed mixture and said product stream into a third bed of reactivated adsorbent thereby repressuring said third bed from said low pressure to said high pressure, thereafter switching the points of introduction and points of withdrawal such that the feed gaseous mixture is introduced into one end of said third bed and the product stream is withdrawn from the other end of said third bed while maintaining said high pressure in said third bed, the purge stream is withdrawn from a point between the ends of said first bed thereby depressuring it to and maintaining at said low pressure in said first bed and said second bed is repressured from said low pressure to said high pressure, thereafter switching the points of introduction and points of withdrawal such that the feed gaseous mixture is introduced into one end of said second bed and the product stream is withdrawn from the other end of said second bed while maintaining said high pressure in said second bed, the purge stream is withdrawn from a point between the ends of said third bed thereby depressuring it to and maintaining at said low pressure in said third bed and said first bed is repressured from said low pressure to said high pressure, and completing the cycle by switching the points of introduction and points of withdrawal to the first mentioned positions with respect to the first, second and third beds.

Swing adsorption beds have been known for many years in which one bed is on an adsorption cycle while a second bed is being regenerated. Regeneration methods are many although the most common are low pressure, high temperature, displacement of the adsorbed component with a desorbing fluid and various combinations of these methods. One of the most common regeneration techniques is to carry out the adsorption step at high pressure and to regenerate the adsorbent by depressuring to a low pressure. The adsorbent may be more rapidly regenerated by introducing a desorbing fluid into the bed while the bed is maintained at a low pressure as a stripping aid thereby purging the adsorbed components from the interstitial spaces surrounding the adsorbent. One of the difficulties of a swing bed adsorption process using high and low pressures is the amount of gas needed to repressure the regenerated bed back up to the high pressure level. Frequently the feed gaseous mixture is produced from another process at a fairly constant rate. However, when the regenerated bed is repressured a large quantity of gas is needed and since this quantity of feed is not available, then the only other available gas is the product stream. This requires the production of net product gas in variable amounts. In many cases the product gas is sent to a compressor and if the product gas is produced at a variable rate, the compressor must be greatly oversized with a large spillback system in order to function properly, necessitating a large expenditure of capital.

Another problem with prior art pressure swing adsorption processes is related to the depressuring step. In large commercially sized adsorption beds having a fixed bed of adsorbent, if the bed is depressured too rapidly, a large pressure drop will be created across the bed of adsorbent creating internal forces and strain. These forces can crush the adsorbent and tear out internal support members and associated screens, plates, etc.

A third problem associated with prior art pressure swing systems also involves the depressuring step. Generally, the bed is depressured by withdrawing the gas through one of the ends. As the pressure approaches the desired low pressure towards the terminal portion of the depressuring step, the driving force to remove the gas from the end opposite that of withdrawal end becomes less effective since the gas must pass through the entire bed of adsorbent requiring the utilization of the pressure drop energy. In other words since the gas must pass through the entire bed of adsorbent, it takes a longer time to uniformly depressure the bed. This effect is even more pronounced when high vacuums are employed in the regeneration step.

It is an object of this invention to disclose an apparatus to overcome the above-mentioned difficulties. It is another object of this invention to disclose a process to overcome the above-mentioned difficulties.

It is a more specific object of this invention to disclose a swing bed, adsorption process for producing a relatively constant amount of non-adsorbed product gas.

It is another more specific object of the invention to control the rate of depressuring of an adsorption bed in an adsorption process utilizing a pressure swing operation.

It is another more specific object of this invention to permit rapid regeneration of the spent adsorbent by employing low pressures and purging the adsorbent from both ends of the bed. It is another more specific object of this invention to minimize the pressure drop across the bed when depressuring and purging by withdrawing the depressuring and purge gas from a point between the ends of the bed while purging from both ends of the bed.

These and other objects will become more apparent in the light of the following detailed description.

Although this invention is described in Examples II and III shown hereinafter to produce a product stream of enriched hydrogen purity from a feed stream containing light hydrocarbons, it is not intended to limit this invention just to the separation of hydrogen from hydrocarbons. For example, this invention may be used to separate water vapor from a wet gas or may be used to separate other gaseous components from each other, such as light hydrocarbons (such as methane and/or ethane) from heavier hydrocarbons (such as propane and/or butane) or may be utilized to separate olefins and/or acetylenes from the more saturated hydrocarbons. Likewise, it can be utilized to remove objectionable contaminant gaseous components from a gaseous mixture such as the removal of mercaptans, $H_2S$, CO and/or $CO_2$ from a primarily hydrocarbon gaseous stream. The choice of adsorbent will depend upon the type of separation and the components to be separated. For example, when separating hydrogen from light hydrocarbons, activated carbon is a preferable adsorbent. Activated alumina and molecular sieves are also preferable adsorbents to achieve the above separation. If the purpose of the process is to remove water vapor, then adsorbents such as silica gel, activated alumina and molecular sieves are preferable as adsorbent. Likewise, for any other kind of separation, the selection of an appropriate adsorbent may be accomplished by utilizing an adsorbent having a high selectivity for the component to be removed.

This invention may be further utilized to fractionate gaseous components from each other. For example, it would be possible to separate air into a stream enriched in nitrogen and a stream enriched in oxygen. Molecular sieves are known to have a higher selectivity for oxygen as opposed to nitrogen.

A preferable arrangement of equipment to accomplish the objectives of this invention is shown in the accompanying figure. The feed gaseous mixture is introduced into flow conduit 1 where it flows into flow conduit 2. It will be assumed at this point in time that adsorption vessel 7 containing adsorption beds 8 and 10 is on the adsorption cycle, vessel 20 containing adsorption beds 21 and 23 is on a depressuring cycle and vessel 33 containing adsorption beds 35 and 37 is on a repressuring cycle. To accomplish this, valves 4, 13, 44, 54, 60, 78, 86 and either 67 or 72 are open while valves 17, 26, 30, 40, 47, 50, 57, 63, 77, 81, 84, 88 and either 72 or 67 are closed. Instrument 95 is a differential pressure sensitive instrument having means to measure the pressure drop across either the upper portion or the lower portion of the vessel on the depressuring cycle as in this case vessel 20. This instrument 95 represents all additional auxiliary equipment such as relays, means for opening and closing control valves automatically, electric circuits, transmitters, amplifiers, timers, means for transmitting pressure differential signal and although this auxiliary equipment is not shown in order to simplify the description of the operation, nevertheless, this equipment is necessary for the proper functioning of the process. Since the selection of this appropriate auxiliary equipment is within the skill of an instrumentation engineer, and this equipment is only incidental to the invention and detailed description is omitted in order to simplify the description of the process. Since vessel 20 is on the depressuring step the high pressure signal is sent through line B' and the low pressure signal is sent through line B while lines A, A', C and C' are disconnected to instrument 95. When vessel 7 goes onto the depressuring step at a later point in time lines A and A' will send the low pressure and high pressure signals, respectively, while lines B and B' will become disconnected. When vessel 33 goes onto the depressuring step at a still later point in time lines C and C' will send the low pressure and high pressure signals, respectively, to instrument 95.

The feed gas is introduced at a high pressure into flow conduit 1 where it flows into flow conduit 2, flow conduit 3, through valve 4, flow conduit 5, flow conduit 6 and into one end of vessel 7. The feed gas contacts the solid adsorbent bed 8 at a high pressure where the non-desirable components of the feed are selectively retained on the adsorbent. The gas passes through vessel 7 including separation zone 9 and adsorbent bed 10 whereupon the enriched desirable component purity product gas is withdrawn from the other end of vessel 7 through flow conduit 11, flow conduit 12, valve 13, flow conduit 14, flow conduit 28 and finally into flow conduit 42.

Valve 60 is open to allow adsorbent beds 21 and 23 in vessel 20 to be depressured from a high pressure to a low pressure. During the initial part of the depressuring step when the pressure in vessel 20 is relatively high, valve 67 is closed while the rate of withdrawal of gas through valve 60 is regulated by control valve 72 which in turn is controlled by differential pressure instrument 95. This initial gas is withdrawn through flow conduit 59, valve 60, flow conduit 61, flow conduit 71, control valve 72, flow conduit 73 and finally out flow conduit 74. During this part of the cycle instrument 95 senses the pressure in separation zone 22 and in flow conduit 24 (across bed 23) and limits the opening of valve 72 to give a preselected difference in said pressures. It is preferable that the maximum allowable pressure differential between the separation zone and the end of the bed be about 5 p.s.i. or less. When the pressure in vessel 20 has closely approached the pressure in flow conduit 74 (within about 5 p.s.i. or less) control valve 72 is closed, valve 67 is opened and compressor 69 is turned on. The remaining gas in vessel 20 is withdrawn through flow conduit 59, valve 60, flow conduit 61, flow conduit 65, flow conduit 66, valve 67, flow conduit 68, compressor 69, flow conduit 70 and finally out flow conduit 74 until vessel 20 has reached the desired low pressure. In addition, additional purge gas (stripping aid) selected from the group consisting of feed gas, product gas and a foreign gas as hereinafter described may be employed to increase the rate of regeneration as, for example, by allowing a small amount of feed gas to flow through flow conduit 75, flow conduit 79, valve 78, flow conduit 93, flow conduit 19 and into one end of vessel 20 and another small amount of feed gas to flow through flow conduit 75, flow conduit 80, flow conduit 82, flow conduit 85, valve 86, flow conduit 90, flow conduit 24 and finally into the other end of vessel 20. It should be noticed that each portion of the additional purge gas only flows through a portion of the total adsorbent in vessel 20 and the pressure drop is reduced accordingly thus saving of the energy requirement of compressor 69. In addition it is preferable to utilize the stripping aid only a portion of the depressuring step time, namely, towards the end of the depressuring step. The stripping aid is more effective when high vacuums have been reached and accordingly valves 78 and 86 should not open until the pressure in vessel 20 is at most atmospheric pressure and preferably 10 to 15 inches of mercury vacuum.

Vessel 33 containing adsorbent beds 35 and 37 is on the repressuring cycle and accordingly valve 54 is open. Although the vessel may be repressured with either feed gas or product gas, the embodiment shown in the drawing employs feed gas as the repressuring gas thereby insuring a relatively constant evolution of product gas in flow conduit 42. The purpose of the repressuring step is to take the vessel containing freshly regenerated adsorbent and increase the pressure within said vessel from said flow pressure to said high pressure such that when the feed is subsequently introduced into said vessel there will be no surge of gas. Control valve 44, on flow control is set to deliver sufficient feed gas to the vessel on the repressuring step such that the vessel will be at said high pressure before the valves are opened and closed to switch the beds. Accordingly, by referring to the figure, the repressuring gas comprising a portion of the total feed gas flows through flow conduit 43, control valve 44, flow conduit 45, flow conduit 48, flow conduit 53, valve 54, flow conduit 55 and finally into vessel 33.

The positions of the valves are maintained as hereinbefore described such that the vessels are in their first position until either just before there is a breakthrough of the least strongly adsorbed non-desirable component of the feed into the gas flowing in flow conduit 11 or until beds 23 and 21 are fully regenerated. If it is desired to maximize recovery of product gas the valves are maintained until just before said breakthrough while beds 23 and 21 are regenerated in a period of time less than that required for said just before breakthrough. The time required for regeneration is affected by the pressure differential between said high pressure and said low pressure as well as the amount of stripping aid employed. Accordingly, in maximizing recovery of product gas, the said low pressure and amount of stripping aid are selected to complete the regeneration in vessel 20 before said just before breakthrough in vessel 7.

At the time when it is desired to swing the beds to their second position, the positions of some of the valves are changed such that vessel 33 is on the adsorption cycle, vessel 20 is on the repressuring cycle and vessel 7 is on the depressuring cycle. This is accomplished by opening valves 30, 40, 50, 81, 84, 57 and 72 while closing valves 4, 13, 78, 86, 60, 54 and 67 and leaving all other valves in the positions hereinbefore described while the signal to instrument 95 is switched so that it measures the pressure drop across bed 10. The feed mixture enters one end of vessel 33 through flow conduit 32 wherein it contacts solid adsorbent bed 35 at a high pressure resulting in the selective adsorption of the non-desirable components of the feed. The gas passes through vessel 33 whereupon the enriched desirable component purity product gas is withdrawn from the other end of vessel 33 through flow conduits 38 and 39, valve 40 and flow conduits 41 and 42.

Valve 57 is open to allow adsorbent beds 8 and 10 in vessel 7 to be depressured from said high pressure to said low pressure. During the initial part of this depressuring step valve 72 controls the rate of depressuring and in turn is controlled by instrument 95 to limit the $\Delta P$ across bed 10 to less than 5 p.s.i. When the pressure in vessel 7 has closely approached the pressure in flow conduit 74, control valve 72 is automatically closed, valve 67 is opened and compressor 69 is turned on. The compressor thereupon pumps the remaining gas plus any additional stripping aid out of vessel 7 until said low pressure is attained. This gas flows out of vessel 7 through flow conduit 56, valve 57, flow conduit 58, flow conduit 66, valve 67, flow conduit 68, compressor 69, flow conduit 70 and flow conduit 74. If stripping aid is employed, a portion of it flows through flow conduit 75, flow conduit 80, valve 81, flow conduit 92, flow conduit 6 and into said one end of vessel 7 while the remaining portion flows through flow conduit 75, flow conduit 80, flow conduit 82, flow conduit 83, valve 84, flow conduit 91, flow conduit 11 and finally into said other end of vessel 7.

Vessel 20 containing adsorbent beds 21 and 23 is now on the repressuring cycle and accordingly valve 50 is open. A portion of the total feed gas flowing in flow conduit 1, passes through flow conduit 43, control valve 44, flow conduit 45, flow conduit 48, flow conduit 49, valve 50, flow conduit 52 and into vessel 20 thereby repressuring it from said low pressure to said high pressure.

At the time when it is desired to swing the beds to their third position from their second position hereinbefore described, the positions of the valves are changed such that vessel 20 is on the adsorption cycle, vessel 7 is on the repressuring cycle and vessel 33 is on the depressuring cycle. This is accomplished by opening valves 17, 26, 47, 88, 77, 63 and 72 while closing valves 30, 40, 50, 81, 84, 57 and 67. The same operations as described hereinbefore are carried out, namely, the adsorption step in vessel 20, the repressuring in vessel 7 and the depressuring and purging in vessel 33.

After completion of the operations with the beds in their third position, the positions of the valves again are switched to the positions initially described thereby returning the beds back to said first position. This switching of beds is periodically continued thus allowing the continuous production of a substantially constant quantity of enhanced desirable component purity product stream while charging a substantially constant quantity of feed mixture. Other variations of this basic flow scheme are possible and it is intended to include these within the scope of this invention. For example, two vessels rather than three can be employed and although either feed will be charged in variable quantities or product will be produced in variable amounts, nevertheless, the techniques of depressuring at a controlled rate and employing stripping aid from both ends of the vessel will result in an equivalent efficient separation process.

Suitable feed gases will include any mixture having an undesirable component which can be removed by contact with an absorbent selective for said undesirable component. A typical example would be a refinery gas stream containing hydrogen and hydrocarbons. By utilizing an activated carbon adsorbent, it is possible to produce a non-adsorbed substantially pure hydrogen stream from a feed stream containing hydrogen and hydrocarbons. Some of these refinery gas streams contain appreciable quantities of nitrogen, and it is possible to reduce the nitrogen content while simultaneously removing the hydrocarbons. Another example is natural gas containing impurities such as mercaptans, $H_2S$, CO and/or $CO_2$ in which said impurities are removed to produce a substantially pure hydrocarbon stream utilizing an adsorbent such as molecular sieves. This process may also be integrated into a petroleum process stream, such as in the recycle gas on a typical reforming unit to produce a recycle gas of enhanced hydrogen purity. Another example would be to insert an apparatus of the present invention into the recycle gas stream of a hydrocracking unit to selectively sorb the light hydrocarbons and thereby produce a recycle gas of enhanced hydrogen purity. In both of these processes, the reactor effluent comprising a normally gaseous material such as hydrogen, methane, ethane, etc. and a normally liquid material such as pentane, hexane, etc. is separated and at least a portion of the normally gaseous material is returned to the reactor as recycle gas. By passing the recycle gas through the process of this invention the hydrogen purity is increased. This enhanced hydrogen purity stream will promote catalyst stability and allow a more efficient functioning hydrocracking or reforming process. Likewise, it is possible to utilize this process to separate other gaseous components by contact with an adsorbent having a selectivity for at least one of the components. Still another application of the utilization of this process would be to separate valuable components from the feed stream in the purge gas rather than in the product gas. In this latter case the selectively adsorbed component is the desired product and it is removed through flow conduit 74 in the figure. An example of recovery of selectively adsorbed components would be in a solvent recovery system for removing a trace quantity of solvent from a gaseous stream such as removing the chlorinated solvent from a dry-cleaning plant.

The adsorbent bed on the adsorption cycle is maintained at a high pressure while the adsorbent bed on the depressuring cycle (being regenerated) is maintained at a low pressure. Said high pressure may be any convenient pressure such as line pressure that the feed gas is available. If the present process were incorporated into the recycle gas on a reforming unit, typical high pressures would be from about 150 to about 500 p.s.i.g. If natural gas were used as feed, then whatever high pressure at which the gas were available would be appropriate high pressure at which to maintain the adsorption cycle bed. Although the adsorption of undesirable components is due to electrostatic and capillary action forces, the mechanism of adsorption is not completely understood. Generally, the loading of undesirable component on an adsorbent increases as the pressure increases at a constant temperature. The adsorbed components can be compared to a liquid on the adsorbent which exert a vapor pressure. When the adsorbent has become fully saturated with adsorbed component, said vapor pressure equals the partial pressure and a reduction of said partial pressure of adsorbed component surrounding the adsorbent will cause some of the adsorbed component to vaporize off the adsorbent thereby removing said component from the adsorption. When the adsorption is fully saturated with an adsorbed component, the adsorbent is characterized as being spent. When the adsorbent has had the adsorbed component removed from the adsorbent, it is characterized as being active. The saturated adsorbent can be activated by a reduction in the total pressure of the system or a reduction in the concentration of the adsorbed component. Another alternative method to remove the adsorbed component is to increase the temperature and thereby increase the vapor pressure of the adsorbed component thus driving off the adsorbed component. The process shown in the figure employs the former methods of regeneration, namely, reducing the pressure and reducing the concentration of an adsorbed component by purging with stripping aid. The amount of adsorbed component removed and the product purity is primarily dependent upon the ratio of the high pressure to the low pressure. For example, if adsorption is accomplished at 300 p.s.i.a. and regeneration is accomplished at 3 p.s.i.a. on a feed gas comprising hydrogen and methane, the maximum hydrogen purity obtainable without purging with stripping aid is 99 mol percent.

In the present process it is preferable to use a combination regeneration method, namely, low pressures and a stripping aid. In order to obtain a completely uncontaminated product very low pressures (high vacuum) and/or very high purge rates of stripping aid must be employed on the regeneration cycle. In most applications completely uncontaminated product is not required and a substantially pure product stream is satisfactory. The severity of the regeneration conditions is dependent upon the required purity of product. In many cases low pressures from atmospheric up to 50 p.s.i.a. or even higher are sufficient when coupled with high pressures of 20 p.s.i.a. up to 500 p.s.i.a. or even higher. In other applications a vacuum system employing vacuums of from about 1 inch to about 29 inches mercury are employed for the low pressures and even combined the purge gas. The purge gas comprises feed gas (as shown in the figure), product gas or a foreign gas not containing an appreciable concentration of those adsorbable components present in the feed gas which is less strongly adsorbed than the components to be removed. An example of the latter foreign gas would be to employ steam when separating hydrogen from a hydrocarbon feed gas over an activated carbon adsorbent. Since the vaporized water contains no hydrocarbon it will reduce the partial pressure of hydrocarbon surrounding the adsorbent thereby aiding in the further removal of hydrocarbon from the adsorbent. Other suitable foreign gases comprise nitrogen and air.

There will be an evolution of heat on the adsorption cycle due to the heat of adsorption and a cooling effect on the regeneration cycle due to the vaporization of adsorbed component off the adsorbent.

The throughput of feed gas is dependent on such factors as the pressure ratio (ratio of high pressure to low pressure), feed composition, adsorbent, desired product purity, temperature, and the time required for the depressuring and repressuring steps in reasonable sized equipment, etc. It is expected that gas hourly space velocity (standard cubic feet of feed gas per hour divided by cubic feet of adsorbent, GHSV) within the range of from about 100 to about 10,000 and preferably from about 500 to 5000 will be employed. However, when it is desired to remove a trace component, a higher GHSV can be employed. In many commercial applications the GHSV is not the limiting factor but rather the limitation is time required for the depressuring and repressuring steps. The time must be selected such as to give reasonably sized equipment although the selected time generally results in GHSV in the above described range. Times of from 2 to 10 minutes before swinging beds are desirable although times of about 5 minutes are preferable.

*Example I*

An apparatus similar to that shown in the figure except having two vessels instead of three is utilized to remove a $CO_2$ contaminant from a natural gas feed mixture. The vessels are loaded with sufficient amount 4 Angstrom molecular sieves such that when processing natural gas at a rate of 1000 standard cubic feet per hour (s.c.f.h.) through one vessel the GHSV is about 2500. The high pressure employed in the vessel on the adsorption cycle is about 50 p.s.i.g. while the low pressure employed in the vessel on the regeneration cycle is about 20 inches of mercury vacuum.

Natural gas having a composition as shown in column 1 of Table 1 is continuously introduced into the vessel on the adsorption cycle at a rate of 1000 s.c.f.h. Purge gas is withdrawn from a point between the ends of the vessel on the regeneration cycle, first by depressuring to the atmosphere and when the vessel pressure has reached atmospheric then by passing through a vacuum pump. No additional stripping aid is employed and when the vessel has reached about 20 inches mercury vacuum, the vessel is repressured up with natural gas. The composition of said purge gas is shown in column 2 of Table 1 and the composition of the desired product gas is shown in column 3 of Table 1.

TABLE 1

| Component | Column 1 Feed Gas | Column 2 Purge Gas | Column 3 Product Gas |
|---|---|---|---|
| $CO_2$ | 0.9 | 10.9 | None detected |
| $CH_4$ | 90.8 | 81.4 | 91.5 |
| $C_2H_6$ | 4.8 | 4.5 | 4.9 |
| $C_3H_8$ | 1.2 | 1.0 | 1.2 |
| $C_4H_{10}$ | 0.2 | 0.2 | 0.2 |
| $N_2$ | 2.1 | 2.0 | 2.2 |

*Example II*

An apparatus similar to that shown in the figure except having two vessels instead of three and having flow conduits hooked up to provide steam as a stripping aid is utilized to produce a substantially pure hydrogen stream from a feed mixture containing hydrogen, methane and other contaminants. The vessel whose dimensions comprise a diameter of 4 feet, a length of 70 feet is designed for maximum service of 150 p.s.i. and 300° F. There is a separation zone 4 feet in length located in the middle of each vessel to separate the upper bed from the lower bed of adsorbent. Purge gas is withdrawn through a 12 inch flow conduit in the middle of said separation zone where it goes into a 20 inch flow conduit header and finally into the suction side of a compressor. The compressor is a reciprocating type cable of high compression ratios in the order of 15 to 1.

Each vessel is loaded with a total of 26,000 pounds of activated carbon, approximately 13,000 pounds in the upper bed and 13,000 pounds in the lower bed. Feed gas is introduced into one end of the vessel on the adsorption cycle through an 8 inch flow conduit at a pressure of 110 p.s.i.g. and a rate of 7,210,000 standard cubic feet per day (s.c.f.d.). The composition of said feed is shown in column 1 of Table 2.

Purge gas is withdrawn through said separation zone of the bed on the regeneration cycle at a rate of 3,010,000 s.c.f.d. where it flows through the 12 inch flow conduit, the 20 inch compressor suction header, the compressor and finally out the compressor discharge flow conduit. During the first part of the depressuring step, the compressor and header are bypassed through a valve controlled by a pressure differential instrument as shown in the figure and the gas is depressured directly into the compressor discharge flow conduit until the pressure in the vessel is close to atmospheric (between 1 and 5 p.s.i.g.) whereupon the bypass valve is closed, the compressor is turned on and the vessel is evacuated down to about 27 inches of mercury vacuum. It is estimated that about twice as much gas will be pumped through the compressor as will be bypassed around the compressor. When the vessel reaches subatmospheric pressure additional purge gas in the form of steam stripping aid is introduced from both ends of the vessel such that a total of 150,000 s.c.f.d. of steam is utilized. The composition of the purge gas excluding the steam is shown in column 2 of Table 2.

Product gas is withdrawn from the other end of the vessel on the adsorption cycle through an 8 inch flow conduit at a rate of 4,200,000 s.c.f.d. and its composition is shown in column 3 of Table 2.

TABLE 2

| Component | Column 1 Feed Gas, s.c.f.d. | Column 2 Purge Gas, s.c.f.d. | Column 3 Product Gas, s.c.f.d. |
|---|---|---|---|
| $H_2$ | 5,120,000 | 1,120,000 | 4,000,000 |
| $CH_4$ | 2,000,000 | 1,870,000 | 130,000 |
| $CO$ | 20,000 | 20,000 | Trace |
| $N_2$ | 70,000 | Trace | 70,000 |

*Example III*

An apparatus similar to that shown in the figure except having no facilities for additional stripping aid is utilized to produce a substantially pure hydrogen stream from a feed mixture containing hydrogen, methane and other contaminants. Each vessel has dimensions comprising a diameter of 3.5 feet and a length of 20 feet. Each vessel is loaded with about 7100 pounds of molecular sieves having uniform pore entrance diameters of about 5 Angstrom units. A reciprocating compressor capable of compression ratios of 15 to 1 and even higher is installed as shown in the figure. The feed gas is introduced and the product gas is withdrawn through 6 inch flow conduits while the purge gas is withdrawn from the middle of the vessel on the depressuring step through a 12 inch flow conduit. The 12 inch flow conduit is connected to a 20 inch compressor suction flow conduit for the subatmospheric part of the depressuring cycle while a bypass system with a control valve activated by a differential pressure instrument is employed for the super-atmospheric part of the depressuring step.

Feed gas whose composition as shown in column 1 of Table 3 is introduced into one end of the vessel on the adsorption cycle at a pressure of 120 p.s.i.g. and at a rate of 900.1 moles/hr. Product gas is withdrawn from the other end of the vessel on the adsorption cycle at a rate of 776.7 moles/hr. as shown in column 3 of Table 3. Purge gas is withdrawn from the middle of the vessel on the depressuring cycle at a rate of 123.4 moles/hr. as shown in column 2 of Table 3. The lowest pressure attained in the vessel on the depressuring cycle is 1.5 p.s.i.a. There is a valve on flow control set to pressure up the vessel in the repressuring cycle from about 1.5 p.s.i.a. to about 120 p.s.i.a. in a period of time of about 95% of the time required before the beds are swung.

TABLE 3

| Component | Column 1 Feed Gas, moles/hr. | Column 2 Purge Gas, moles/hr. | Column 3 Product Gas, moles/hr. |
|---|---|---|---|
| $N_2$ | 2.8 | 2.1 | 0.7 |
| $H_2$ | 839.0 | 69.4 | 769.6 |
| $CO$ | 11.6 | 11.6 | Trace |
| $CH_4$ | 45.7 | 39.3 | 6.4 |

It should be noted that the hydrogen purity of the feed gas is about 93.2 mole percent whereas the hydrogen purity of the product is about 99.1 mole percent.

I claim as my invention:

1. A cyclic process for the continuous production of a product gas comprising a desirable component from a gaseous mixture employing three parallel fixed elongated beds of adsorbent selective for the non-desirable component which comprises the steps:

introducing a feed gaseous mixture containing said desirable component into one end of a first elongated bed of active adsorbent maintained at high pressure and withdrawing a product stream of enriched desirable component purity from the other end of said first bed, during at least part of the time of said feed introduction step withdrawing a purge stream of enriched non-desirable component purity from a second elongated bed of inactive adsorbent at a point approximately midway between the ends of said second bed thereby reactivating the adsorbent by maintaining a low pressure in said second bed and removing the non-desirable components from the adsorbent, during at least part of the time of said feed introduction step introducing a gas selected from the group consisting of said feed mixture and said product stream into a third elongated bed of reactivated adsorbent thereby repressuring said third bed from said low pressure to said high pressure, thereafter switching the points of introduction and points of withdrawal such that the feed gaseous mixture is introduced into one end of said third bed and the product stream is withdrawn from the other end of said third bed, while maintaining said high pressure in said third bed, the purge stream is withdrawn from a point approximately midway between the ends of said first bed thereby depressuring it to and maintaining at said low pressure in said first bed and said second bed is repressured from said low pressure to said high pressure, thereafter switching the points of introduction and points of withdrawal such that the feed gaseous mixture is introduced into one end of said second bed and the product steam is withdrawn from the other end of said second bed while maintaining said high pressure in said second bed, the purge stream is withdrawn from a point approximately midway between the ends of said third bed thereby depressuring it to and maintaining at said low pressure in said third bed and said first bed is repressured from said low pressure to said high pressure, and completing the cycle by switching the points of introduction and points of withdrawal to the first mentioned positions with respect to the first, second and third beds.

2. In a process for the separation of a gas comprising a desirable component from a gaseous mixture employing an elongated fixed bed of adsorbent selective for a non-desirable component, the improvement which comprises introducing the feed mixture into one end of said bed of adsorbent and withdrawing a product stream of enriched desirable component purity from the other end of said bed while maintaining said bed at a high pressure thereby deactivating the adsorbent, thereafter stopping the flow of feed mixture and product stream, depressuring the bed to subatmospheric pressure by withdrawing a purge gas from a point approximately midway between the one end and the other end of said elongated bed thereby reactivating the adsorbent, and after the adsorbent is restored to its active state, stopping the withdrawal of purge gas and repressuring the bed to said high pressure.

3. The process of claim 2 further characterized in that stripping aid comprising additional purge gas selected from the group consisting of feed mixture and product stream is introduced simultaneously into both ends of the bed during at least a portion of the depressuring step thereby aiding in reactivating the adsorbent by increasing the rate of removal of the non-desirable component from the adsorbent.

4. The process of claim 2 further characterized in that the rate of purge gas during that part of the depressuring step when the pressure is lowered from said high pressure to atmospheric is controlled and limited by an instrument detecting the pressure difference across at least a portion of the bed.

5. The process of claim 4 further characterized in that the adsorbent is selected from the group consisting of activated alumina, activated carbon and molecular sieves, the feed mixture comprises hydrogen and at least one light hydrocarbon and the desirable component is hydrogen.

6. A cyclic process for the separation of a gas comprising hydrogen from a gaseous mixture comprising hydrogen and at least one hydrocarbon, employing at least one elongated adsorbent bed, said process comprising the steps:

(a) introducing the feed gaseous mixture into one end of said elongated bed of active adsorbent maintained at a high pressure and withdrawing a product gas of enriched hydrogen purity from the other end of said bed until the adsorbent has deactivated to a predetermined extent;

(b) thereupon stopping the flow of feed mixture to said bed and depressuring the bed to subatmospheric pressure by withdrawing a purge gas from a point approximately midway between the one end and the other end of said elongated bed;

(c) continuing the depressuring step until the adsorbent is restored to its active state;

(d) repressuring said bed back up to said high pressure with a gas selected from the group consisting of feed mixture and product gas;

(e) completing the cycle by introducing said feed mixture into said one end of said bed; and (f) continuing the introduction, depressuring and repressuring steps in consecutive sequence to produce the enriched hydrogen purity product gas stream.

7. The process of claim 6 further characterized in that a stripping aid gas selected from the group consisting of feed mixture and product gas is introduced simultaneously into both ends of the bed during at least a portion of the depressuring step thereby aiding in reactivating the adsorbent by increasing the rate of removal of hydrocarbon from the adsorbent.

8. The process of claim 7 further characterized in that the adsorbent is selected from the group consisting of activated alumina, activated carbon and molecular sieves.

9. A cyclic process for the continuous production of a product gas comprising hydrogen from a feed gaseous mixture comprising hydrogen and at least one hydrocarbon in which three parallel fixed elongated beds of adsorbent selective for the hydrocarbon component are employed each bed having a one end and an other end, said process comprising the steps:

introducing the feed mixture into one end of a first elongated bed of active adsorbent maintained at high pressure and withdrawing the product gas from the other end of said first bed, during at least part of the time of said feed introduction step withdrawing a purge stream from a second elongated bed of inactive adsorbent at a point approximately midway between the ends of said second bed thereby reactivating the adsorbent by maintaining a low pressure in said second bed and removing the hydrocarbon component from the adsorbent, during at least part of the time of said feed introduction step introducing a gas selected from the group consisting of said feed mixture and said product gas into a third elongated bed of reactivated adsorbent thereby repressuring said third bed from said low pressure to said high pressure, thereafter switching the points of introduction and the points of withdrawal such that the feed gaseous mixture is introduced into one end of said third bed and the product gas is withdrawn from the other end of said third bed, while maintaining said high pressure in said third bed, the purge stream is withdrawn from a point approximately midway between the ends of said first bed thereby depressuring it to and maintaining at said low pressure in said first bed and said second bed is repressured from said low pressure to said high pressure, thereafter switching the points of introduction and points of withdrawal such that the feed gaseous mixture is introduced into one end of said second bed and the product stream is withdrawn from the other end of said second bed while maintaining said high pressure in said second bed, the purge stream is withdrawn from a point approximately midway between the ends of said third bed thereby depressuring it to and maintaining at said low pressure in said third bed and said first bed is repressured from said low pressure to said high pressure, and completing the cycle by switching the points of introduction and points of withdrawal to the first mentioned positions with respect to the first, second and third beds.

10. The process of claim 9 further characterized in that the adsorbent is activated carbon.

11. The process of claim 9 further characterized in that a stripping aid comprising an additional purge stream selected from the group consisting of the feed mixture and the product gas is introduced simultaneously into both ends of the bed on the depressuring step of the cycle during at least a portion of said depressuring step thereby aiding in reactivating the adsorbent by increasing the rate of removal of the hydrocarbon from the adsorbent.

12. The process of claim 9 further characterized in that the rate of withdrawal of purge stream during that part of the depressuring step when the pressure is lowered from said high pressure to atmospheric is controlled and limited to give no more than a maximum preselected pressure drop across a portion of the adsorbent bed by an instrument having means of measuring said pressure drop and means for controlling the withdrawal of said purge stream.

13. A process for the separation of a gas comprising a desirable component from a gaseous mixture employing at least two elongated fixed beds of adsorbent operated on a swing bed cycle which comprises the steps:

(a) introducing a feed gaseous mixture containing said desirable component into one end of a first elongated bed of active adsorbent maintained at a high pressure and withdrawing a stream of enriched desirable component purity from the other end of the first bed of adsorbent;

(b) continually passing the feed mixture through said first bed thereby deactivating the adsorbent for a time less than that required for a decrease in said enriched desirable component purity of the stream leaving the other end of the first bed;

(c) thereupon stopping the flow of feed mixture to the first bed while introducing the feed into a second elongated adsorbent bed and lowering the pressure of said first bed by withdrawing gas from a point approximately midway between said one end and said other end, thereby reactivating the adsorbent;

(d) continually reactivating the adsorbent at a low pressure until it is substantially at its said active state;

(e) repressuring the first bed back up to said high pressure; and (f) completing the cycle by introducing said feed mixture into said one end of said first bed.

14. The process of claim 13 further characterized in that a stripping aid comprising a foreign gas which is less strongly adsorbed on the adsorbent than both components to be removed is introduced simultaneously into the ends of the bed during at least a portion of the depressuring step thereby aiding in reactivating the adsorbent by increasing the rate of removal of those compounds to be removed from the adsorbent.

15. The process of claim 14 further characterized in that the adsorbent is activated carbon, those components to be removed comprise hydrocarbons and the foreign gas is steam.

16. In a continuous hydrocarbon conversion process wherein a hydrocarbon feed is passed, in admixture with recycle hydrogen purified as hereinafter defined, through a reactor containing a catalyst, at least a portion of the reactor effluent normally gaseous material being recycled to the reactor, the improvement which comprises continuously introducing at least a portion of said gaseous material at a substantially constant rate into one end of a first elongated bed of active adsorbent and continuously withdrawing a stream of enriched hydrogen purity at a substantially constant rate from the other end of the first bed of adsorbent and returning said enriched stream to supply said purified hydrogen; continually passing the gaseous material through said first bed thereby deactivating the adsorbent, thereupon stopping the flow of gaseous material to the first bed while introducing the gaseous material at said first-mentioned constant rate into one end of a second elongated bed of active adsorbent and continuously withdrawing a stream of enriched hydrogen purity at said second-mentioned constant rate from the other end of said second bed and returning said last-mentioned enriched stream to supply said purified hydrogen; and, during passage of said gaseous material through said second bed, lowering the pressure of said first bed by withdrawing gas from a point approximately midway between said one end and said other end thereby reactivating the adsorbent of said first bed.

17. The process of claim 16 wherein said hydrocarbon conversion process is a hydrocracking process.

18. The process of claim 16 wherein said hydrocarbon conversion process is a reforming process.

19. In a process for the separation of a gas comprising a desirable component from a feed gaseous mixture employing an elongated fixed bed of adsorbent selective for a non-desirable component, the improvement which comprises introducing the feed mixture into one end of said bed and withdrawing a product stream of enriched desirable component purity from the other end of said bed while maintaining said bed at a high pressure thereby adsorbing the non-desirable component while deactivating the adsorbent, and thereafter reactivating the adsorbent at a low pressure by withdrawing a purge gas of enriched non-desirable component purity from a point approximately midway between the one end and the other end of said elongated bed.

References Cited by the Examiner
UNITED STATES PATENTS

| | | | |
|---|---|---|---|
| 2,988,502 | 6/1961 | Richards et al. | 260—676 |
| 3,141,748 | 7/1964 | Hoke et al. | 208—95 |

DELBERT E. GANTZ, *Primary Examiner.*

ABRAHAM RIMENS, *Examiner.*